May 22, 1951 H. W. DIETERT ET AL 2,553,754
MOISTURE METER
Filed Sept. 15, 1947 4 Sheets-Sheet 1
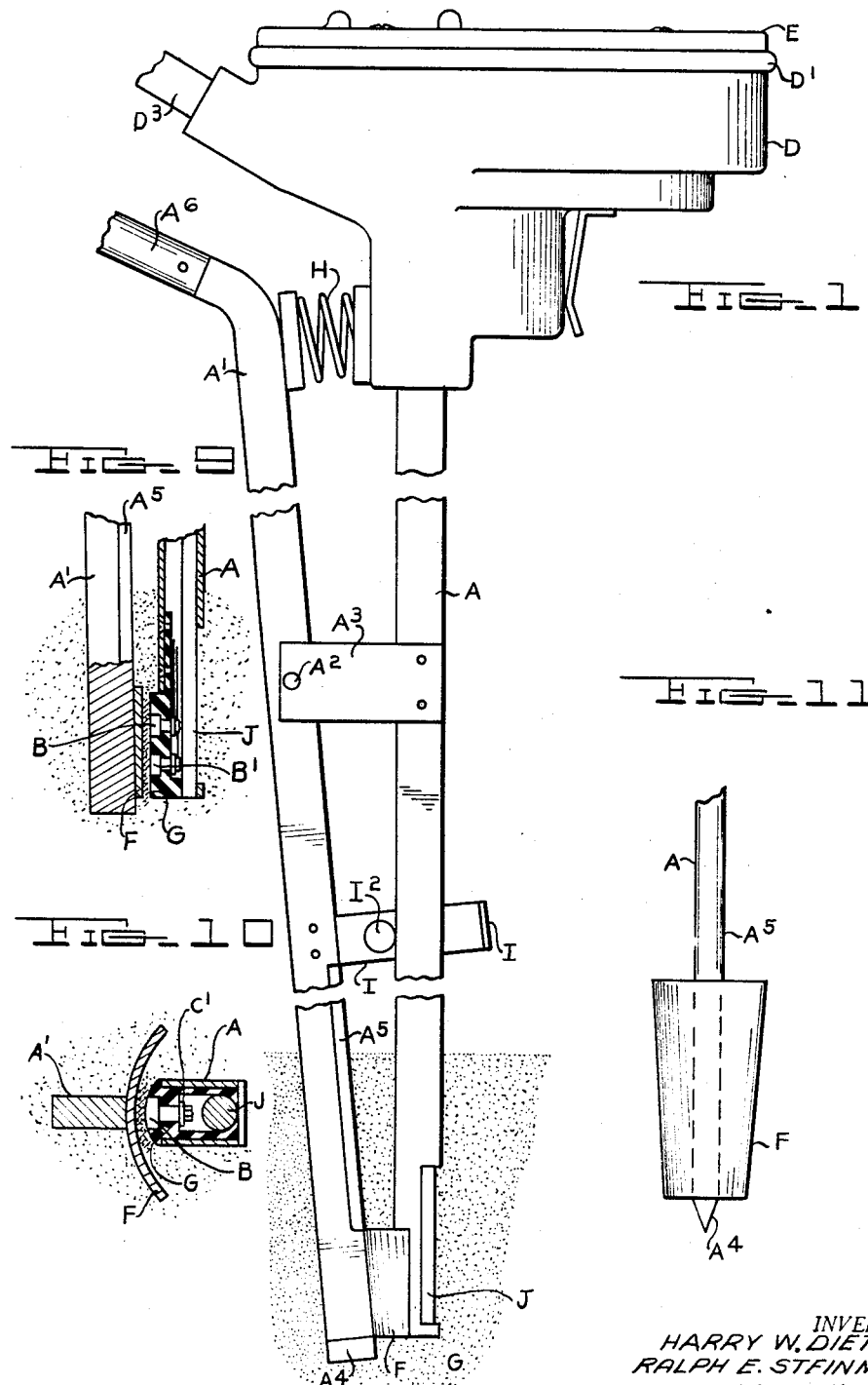
INVENTORS
HARRY W. DIETERT
RALPH E. STEINMUELLER
CARL M. KING
By Whittemore Hulbert & Belknap
ATTORNEYS

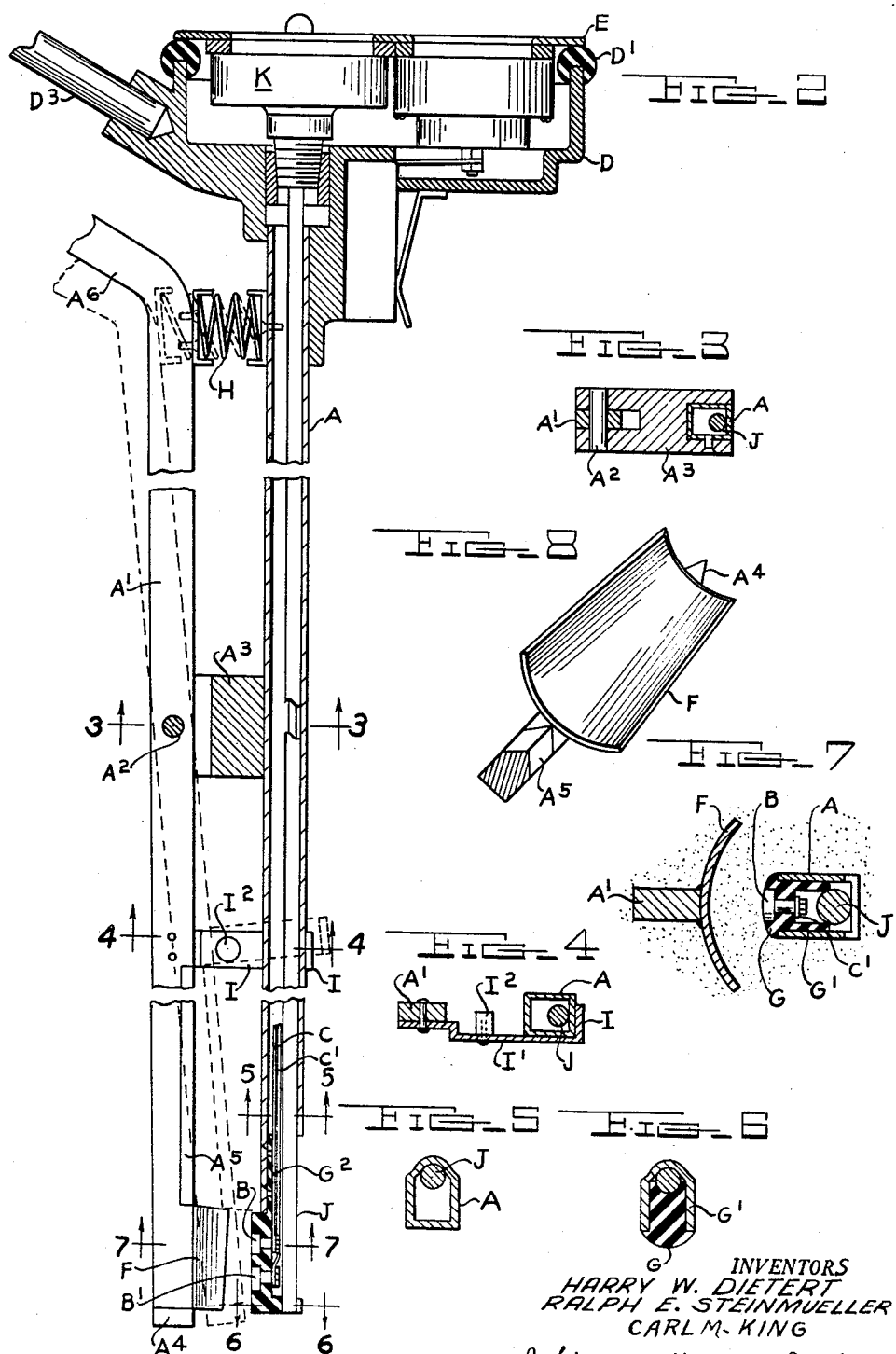

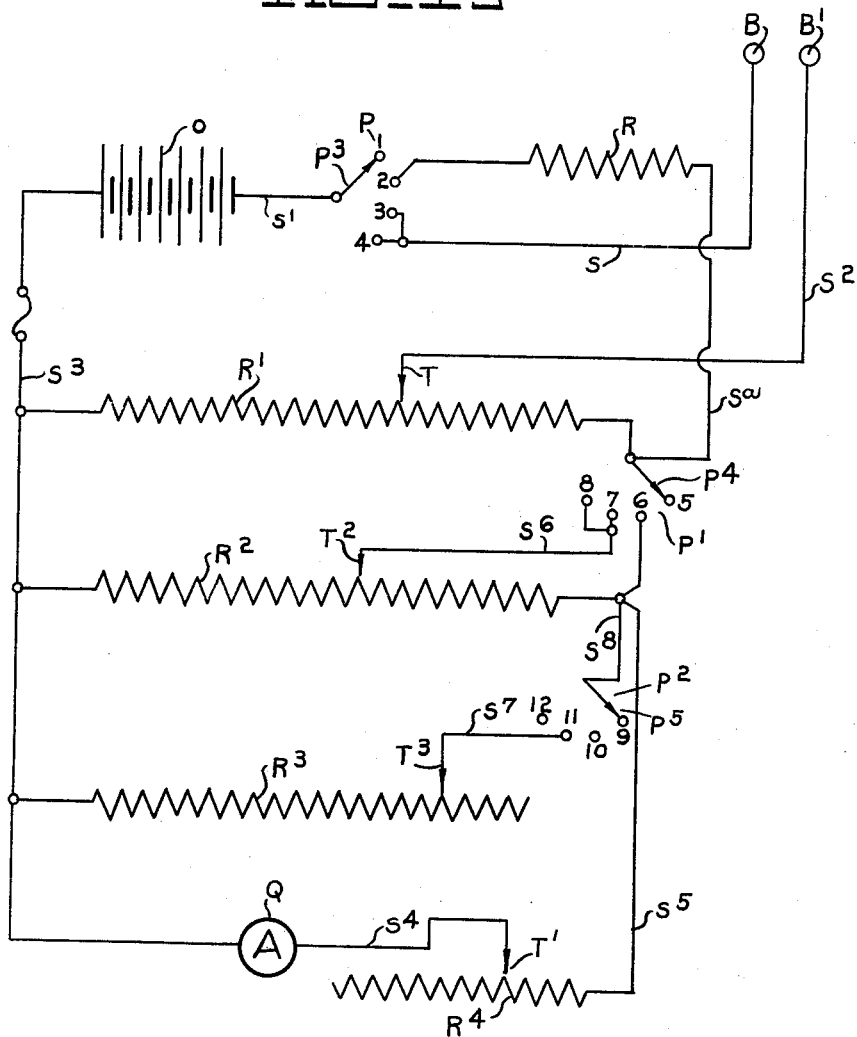

Patented May 22, 1951

2,553,754

UNITED STATES PATENT OFFICE 2,553,754

MOISTURE METER

Harry W. Dietert, Ralph E. Steinmueller, and Carl M. King, Detroit, Mich., assignors to Harry W. Dietert Company, Detroit, Mich., a corporation of Michigan Application September 15, 1947, Serial No. 774,124

7 Claims. (Cl. 175—183)

The invention relates to means for measuring the moisture content of loose granular material, such for instance as molding sands. It is the primary object of the invention to obtain a metering instrument which when used for testing materials will give a direct reading of the moisture content thereof.

It is a further object to obtain a construction which can be quickly adjusted to compensate for variables affecting the accuracy of the indication.

Still further it is an object to obtain a construction capable of performing the tests at various points within a mass of the material to determine the average moisture content thereof. With these and other objects in view the invention consists in the construction as hereinafter set forth.

In general the improved instrument determines the moisture content of the material tested by measuring its resistance to the passage of an electrical current therethrough. There are, however, various other factors than the moisture content which affect the electrical conductivity or resistance of loose granular materials including temperature, composition of material and compactness thereof. It is, therefore, necessary to compensate for such variables before the electrical measurement will accurately indicate the moisture content. Correction of temperature is effected by adding or subtracting resistance from the electrical circuit in which the specimen is located. Correction for differences in composition is obtained by adding or subtracting resistance in the test circuit in accordance with known differences in electrical resistance of the materials determined by dry tests. Correction for variations in electrical resistance due to variations in compactness is accomplished by compressing the tested portion to a predetermined compactness. A further variable is due to the fact that the moisture content in a mass of material is not necessarily uniform throughout the same. Our improved instrument is, therefore, of a construction which permits of inserting the same to various steps and in various positions within the mass to be tested.

More in detail our improved moisture content metering instrument is preferably of the construction shown in the accompanying drawings in which Fig. 1 is a side elevation of the instrument showing the same as inserted in a pile of sand and in position ready for taking a moisture content reading;

Fig. 2 is a longitudinal section showing the parts in position for insertion of the instrument into the sand;

Figs. 3, 4, 5, 6 and 7 are cross sections respectively, of lines 3—3, 4—4, 5—5, 6—6 and 7—7 of Fig. 2;

Fig. 8 is a perspective view of the specimen receiving cup and a portion of the arm carrying the same;

Fig. 9 is a section similar to the lower portion of Fig. 2 but with the parts in position for compacting the specimen in the cup;

Fig. 10 is a view similar to Fig. 7 with the parts in position of Fig. 9;

Fig. 11 is a front elevation of the specimen receiving cup and arm;

Fig. 13 is a diagrammatic view illustrating the arrangement of the electric circuits and variable resistance means.

Figure 12:
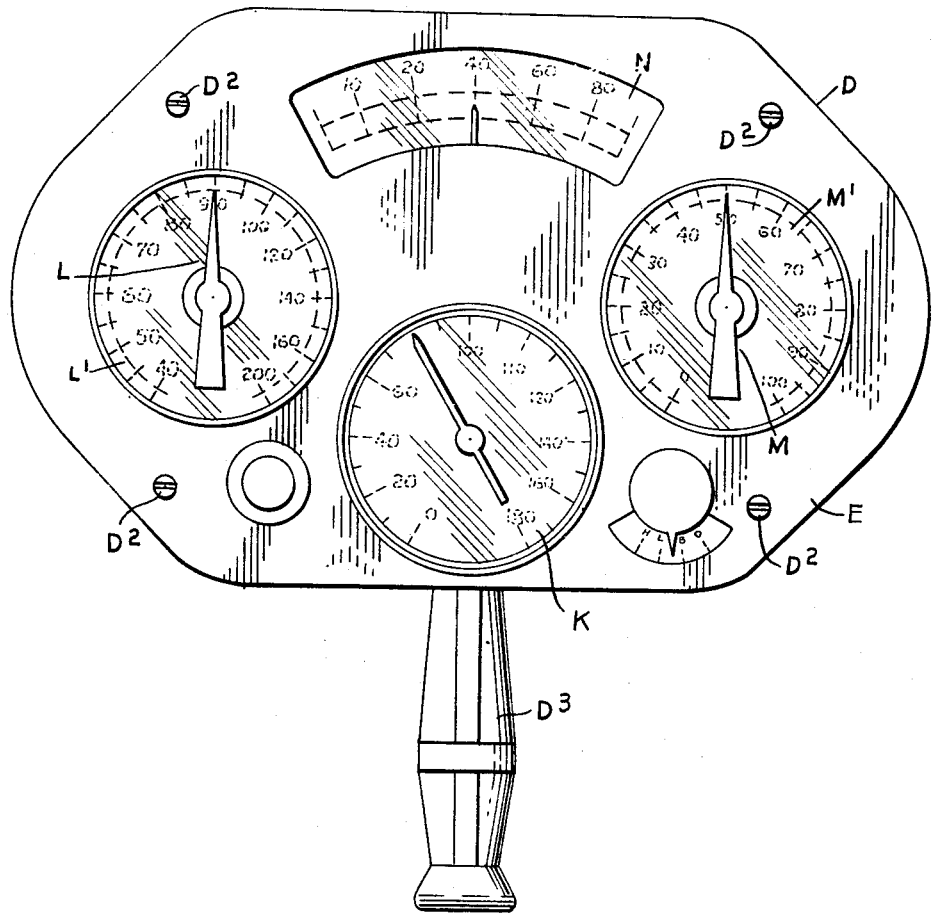
Fig. 12 is a plan view of the head carrying the indicators.

Generally described the instrument comprises a pair of connected, but relatively movable, elongated members or arms arranged adjacent to each other and constituting what might be termed a forceps. One of these arms A is tubular and carries at its lower end a pair of spaced insulated electrodes B and B', which are connected to conductors C and C' extending upward through the tube and forming a part of an electrical circuit hereinafter described. At the upper end of the arm A is a hollow head or casing D with a top closure plate or panel E, which latter carries the various indicators and adjustment devices. To protect these parts from shock the panel E is preferably engaged with a cushion D' surrounding the upper flange of the head being secured to the latter by screws $D^2$. The head D is also provided with a laterally extending handle $D^3$ by which it is carried. The companion arm A' of the connected pair is pivotally attached at $A^2$ to a block $A^3$ mounted on the arm A at an intermediate point in the length thereof. At the lower end of the arm A' is a specimen receiving cup F. This is of an arcuate cross section but longitudinally is slightly flared from its lower to its upper end. In the position of parts shown in Fig. 7, the cup F is concentric with but spaced from the arcuate face G of the insulator mounting G' for the spaced electrodes B and B'. This mounting G' has a shank portion $G^2$ fitting within the lower end of the tube forming the arm A, but the arcuate face G extends outward through a cutaway portion of said tube to be opposite the cup F. When the arms are relatively positioned for insertion into the body of sand, as illustrated in Fig. 2, the cup F and face G are longitudinally substantially parallel to each other which facilitates the insertion of the same through the sand body without any compression of the material therebetween. Also the lower edge of the cup F is preferably sharpened to a knife edge to cut through the sand and the flaring form of the cup prevents any compression of the sand therein or the carrying of sand from one portion of the pile to another. To further lessen resistance to movement of the instrument through the sand, the lower end of the arm A' is V-shaped as indicated at $A^4$ and a similar V-form $A^5$ is given to the arm A' on the edge facing the arm A. Thus after insertion of the arms into the sand with the parts in the position in Fig. 2, the arm A' is tilted on its pivot $A^2$ to move the cup B towards the arcuate face G of the insulator G' and electrodes B and B' thereby compressing the portion of the sand body lying therebetween. It is important that the compression or compacting of the sand should be the same in all tests and this is accomplished by a spring H arranged between the arms A and A' in the upper portions thereof. A handle $A^6$ extends from the upper end of the arm A' parallel to the handle $D^3$ so that the operator by moving these handles towards each other will compress the spring H to bring the arms A and A' in the parallel position shown in Fig. 2. A stop I carried by a finger I' secured to the arm A' limits the movement of the handles $A^6$ and $D^3$ towards each other and a second stop $I^2$, also on the finger I', limits the movement of the arms A and A' towards each other under actuation of the spring H.

With the construction as thus far described it will be understood that the operator holding the instrument by the handles $D^3$ and $A^6$ can insert the arms A and A' into the mass of sand or other material to be tested in any position therein and to any desired depth within the length of said arms. The arms are, therefore, made relatively long and in the parallel position indicated in Fig. 2 they will cut through the sand body without either compressing the same or carrying sand from one portion of the pile to another position. Also the sand passing over the electrodes B and B' will scour the same and remove any surface coating. After the instrument is properly positioned release of the handle $A^6$ will permit the spring H to move the arm A' compressing the portion of sand between the cup F and surface G and also between the electrodes B and B'. This is illustrated in Figs. 9 and 10.

As above described the moisture content of the sand or other material tested is determined by its electrical conductivity. There are, however, variables that affect the conductivity of the material other than that due to moisture content and degree of compactness of the material. These, as previously stated, include temperature variations and variable conductivity of different granular materials as determined by dry tests. The specific value of the last variable is indicated by the number given to the sand material which is determined by dry tests. To cancel out these temperature and material variables, it is only necessary to introduce coresponding resistances into the electric circuit which includes the electrodes B and B' and the measuring instrument. However, the temperature must be measured at the particular point within the mass of material where the electrodes and compressor cup are located. For this purpose a thermometer is placed within the tube A with its temperature sensitive portion located adjacent to the electrodes. The specific construction of this thermometer is not a part of the invention and it is, therefore, illustrated only as a tube J which extends from the head D to the lower end of the arm A. At its upper end this tube is connected to an indicator K mounted on the panel E and thus the operator is informed as to the temperature of the compressed material lying adjacent to the electrodes. The panel E has also mounted thereon adjustable members L and M for controlling variable electrical resistances to be included in the electric circuit. The member L has an indicator L' calibrated in degrees of temperature corresponding to the calibration of the thermometer indicator K. The member M has an indicator dial M' calibrated to correspond to the numbers given to various materials which are to be tested. The panel E has also mounted thereon an ammeter having an indicator calibrated in percentages corresponding to moisture content. The specific construction of the members K, L, M and N is not illustrated as various instruments are available for such use. However, the diagram Fig. 13 illustrates one arrangement of electric circuits and variable resistances.

As illustrated O is a constant potential electric generator, such as a battery. P, P', $P^2$ are portions of a multiple contact electric switch which in the actual structure have a common axis but are separated in the diagram to more clearly indicate the circuits. B and B' are the spaced electrodes previously described. Q is an ammeter and R, R', $R^2$, $R^3$ and $R^4$ are resistors connected into the electric circuit as follows. The switch portion P has four contacts 1, 2, 3 and 4 for cooperation with a movable contact arm $P^3$. The switch portion P' has corresponding contacts 5, 6, 7 and 8, and the switch portion $P^2$ has corresponding contacts 9, 10, 11 and 12. Starting from the electrodes B and B' the electrode B is connected by a conductor S with both of the contacts 3 and 4 and the movable contact arm P' is connected by a conductor S' with one pole of the generator. The electrode B' is connected by a conductor $S^2$ to a movable contact T cooperating with the resistor R'. This construction constitutes a potentiometer, one end of the resistor R' being connected by a conductor $S^3$ to the opposite pole of the generator O and the other end of the resistor R' being connected by a conductor Sa with the contact 2 of the switch portion P. The latter conductor includes the resistor R. An extension of the conductor $S^3$ leads to the ammeter Q, the opposite terminal of which is connected by a conductor $S^4$ with a movable contact T' cooperating with the resistor $R^4$. A conductor $S^5$ leads from the resistor $R^4$ to the contact 6 of the switch portion P'. The resistor $R^2$ is connected between the conductors $S^3 S^5$ and in connection with a movable contact $T^2$ constitutes a potentiometer connected by a conductor $S^6$ with the contacts 7 and 8. The resistor $R^3$ has one end connected to the conductor $S^3$ and a movable contact member $T^3$ is connected by a conductor $S^7$ with the contact 11 of the switch portion $P^2$. When the movable contact arm $P^3$ is in the position illustrated, all circuits are broken. When said arm is moved to position 2 (the arms $P^4$ and $P^5$ of the switch portions P' and $P^2$ being simultaneously moved) a circuit is closed, which starting from the generator includes successively the conductor S', resistor R, conductors $S_a$ $S^5S^4$, ammeter Q and conductor $S^3$ to the opposite pole of the generator. This circuit is used for testing the generator, which must give a predetermined reading on the ammeter to be suitable for making the moisture determining tests. When the arm $P^3$ is moved to contact 3 (the arm $P^4$ moving to contact 7 and the arm $P^5$ to contact 11) a circuit is established leading from the generator through conductors S'S, electrodes BB' with the compacted sand therebetween, conductor $S^2$, resistor R', conductor $S^6$, resistor $R^2$, conductor $S^5$, resistor $R^4$, conductor $S^4$, ammeter Q and conductor $S^3$ to the opposite pole of the generator. There is also established a shunt circuit around the ammeter including the conductor $S^8$, arm $P^5$, conductor $S^7$ and resistor $R^3$. When the arm P is moved to position 4 (the arms $P^4$ and $P^5$ being respectively in positions 8 and 12) the circuit through the ammeter will be the same as last described but the shunt through the resistor $R^3$ will be broken.

Operation

In making the tests the operator first adjusts the member M to set the same to the number on the dial M' which corresponds with the number of the sand or other material to be tested for moisture content. After the arms A and A' have been inserted into the body of the sand, as previously described, and released to compact sand between the cup F and surface G, the operator takes the temperature reading on the thermometer K and adjusts the adjustable member L to the same number on the dial L'. The adjustment of the member M cuts in or out sufficient resistance of the resistor $R^2$ to cancel the conductivity due to the individual character of the material tested. The adjustment of the member L cuts in or out sufficient resistance of the resistor R' to cancel any conductivity due to temperature. Consequently the current flowing through the ammeter will be due solely to the conductivity of the moisture content of the material and the reading will be in percentage of moisture content.

It will be appreciated that with this instrument tests can be rapidly made. Also by averaging the readings taken from different positions within the mass, the moisture content of the whole will be determined with greater accuracy.

What we claim as our invention is:

1. An instrument for measuring the moisture content of loose granular materials, comprising a pair of connected members constituting an elongated forceps, a pair of spaced electrodes carried by one member of said forceps and together therewith freely insertable within the mass of the material to be tested, means on the other member of the forceps for compacting a body of the material in bridging relation to said electrodes, a source of electrical energy, a meter, a circuit including said source, meter and electrodes, a plurality of variable resistant resistors included in said circuit, means for individually adjusting each resistor to cancel out a conduction variable other than that due to moisture content, and means carried by the instrument in full view of the operator for indicating the adjustment to be made.

2. An instrument for measuring the moisture content of loose granular materials, comprising a pair of connected members constituting an elongated forceps, a pair of spaced electrodes carried by one member of said forceps and together therewith freely insertable within the mass of the material to be tested, means on the other member of the forceps for compacting a body of the material in bridging relation to said electrodes, a source of electrical energy, a meter, a circuit including said source, meter and electrodes, means for compacting the material adjacent to and between said electrodes, a plurality of variable resistance resistors included in said circuit, means for individually adjusting said resistors to compensate for temperature variations and to cancel out a conduction variable of the particular material to be tested other than that due to moisture content, and means carried by the instrument in full view of the operator for indicating the adjustment to be made.

3. In an instrument for measuring the moisture content of loose granular materials, a pair of connected members constituting an elongated forceps freely insertable within the mass of the material to be tested, a pair of spaced electrodes carried by one member of said forceps and connected into an electrical current measuring circuit, means on the other member of said forceps for compacting a body of the material in bridging relation to said electrodes, and an instrument carrying panel supported on the forceps in a position to be viewed when the forceps are inserted into the material.

4. In an instrument for measuring the moisture content of loose granular materials, a pair of connected members constituting an elongated forceps insertable within the mass of the material to be tested, a pair of spaced electrodes carried by one member of said forceps and connected into an electrical current measuring circuit, means on the other member of said forceps adapted to freely cut through the material and then compacting a portion thereof against said electrodes, and means for placing a predetermined load on said forceps to effect said compacting.

5. In an instrument for measuring the moisture content of loose granular materials, a pair of connected members constituting an elongated forceps, a pair of spaced electrodes mounted on one of said members and connected into an electrical measuring circuit, a cup carried by the other of said members opposite said electrodes and having a lower thin edge adapted to cut through the material when said forceps is inserted therein with negligible compression thereof and manually held in open position, and means for closing said forceps with a predetermined force to compact material in said cup against said electrodes.

6. An instrument for measuring the moisture content of loose granular materials, a pair of connected members constituting an elongated forceps, a pair of electrodes mounted on one of said members and connected into an electrical measuring circuit, a cup carried by the other of said members being of substantially segmental cylindrical form and longitudinally parallel to the electrode carrying member when said forceps is manually held in open position, and resilient means for closing said forceps with a predetermined force to effect a predetermined compacting of the material in said cup against said electrodes.

7. An instrument for measuring the moisture content of loose granular materials, a pair of connected members constituting an elongated forceps, a pair of electrodes mounted on one of said members and connected into an electrical measuring circuit, a cup carried by the other of said members being of substantially segmental cylindrical form with slightly enlarging radii from its lower to its upper end and longitudinally parallel to and concentric with said electrode carrying member when said forceps is manually held in open position and during its insertion into the material, and a spring for closing said forceps with a predetermined force to obtain a predetermined compacting of the material against said electrodes.

HARRY W. DIETERT.
  RALPH E. STEINMUELLER.
  CARL M. KING.

REFERENCES CITED

The following references are of record in the file of this patent:

UNITED STATES PATENTS

| Number | Name | Date |
|---|---|---|
| 1,610,563 | McIlvaine | Dec. 14, 1926 |
| 1,826,247 | Heppenstall | Oct. 6, 1931 |
| 2,063,840 | Fairchild et al. | Dec. 8, 1936 |
| 2,122,363 | Christie | June 28, 1938 |
| 2,123,812 | Stevens et al. | July 12, 1938 |
| 2,150,015 | Witham | Mar. 7, 1939 |
| 2,466,453 | Locke | Apr. 5, 1949 |